United States Patent
Kachouh et al.

(10) Patent No.: US 8,275,511 B2
(45) Date of Patent: Sep. 25, 2012

(54) CRYPTOLOGY CALCULATION FOR REMOTE ENTRY DEVICES

(75) Inventors: Patricia Kachouh, Sterling Heights, MI (US); Brian Marlett, Macomb, MI (US); Jose Luis Herrera Martinez, Jalisco (MX); Mauricio Carrera Manjarrez, Jalisco (MX)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1362 days.

(21) Appl. No.: 11/930,996

(22) Filed: Oct. 31, 2007

(65) Prior Publication Data

US 2008/0109123 A1 May 8, 2008

Related U.S. Application Data

(60) Provisional application No. 60/856,691, filed on Nov. 3, 2006.

(51) Int. Cl.
*G06F 7/06* (2006.01)
(52) U.S. Cl. ............ 701/36; 701/2; 340/5.26; 340/5.61; 340/5.72; 70/256
(58) Field of Classification Search .................. 701/1, 2, 701/32, 36; 380/255, 273; 341/173, 176; 235/382, 382.5; 307/9.1–10.3, 10.5, 10.6; 180/287; 70/256; 340/5.64, 5.61, 5.72, 10.3–10.32, 426.13, 426.14, 426.35, 426.36, 5.26
See application file for complete search history.

(56) References Cited

U.S. PATENT DOCUMENTS

| | | | | |
|---|---|---|---|---|
| 6,043,752 A | * | 3/2000 | Hisada et al. | 340/5.26 |
| 6,332,572 B1 | * | 12/2001 | Yamamoto et al. | 235/382 |
| 6,549,116 B1 | | 4/2003 | Honda et al. | |
| 2004/0090308 A1 | * | 5/2004 | Takahashi et al. | 340/5.72 |
| 2004/0232771 A1 | * | 11/2004 | Dechamps | 307/10.1 |

FOREIGN PATENT DOCUMENTS

| | | |
|---|---|---|
| DE | 19856695 | 6/2000 |
| EP | 0955217 | 11/1999 |
| EP | 1336939 | 8/2003 |

OTHER PUBLICATIONS

International Search Report and Written Opinion mailed on Oct. 24, 2008.

* cited by examiner

*Primary Examiner* — Khoi Tran
*Assistant Examiner* — Spencer Patton

(57) ABSTRACT

A passive entry and start system includes a controller that calculates the cryptology required for each remote identification device during idle transmission time to reduce overall system actuation time.

20 Claims, 2 Drawing Sheets

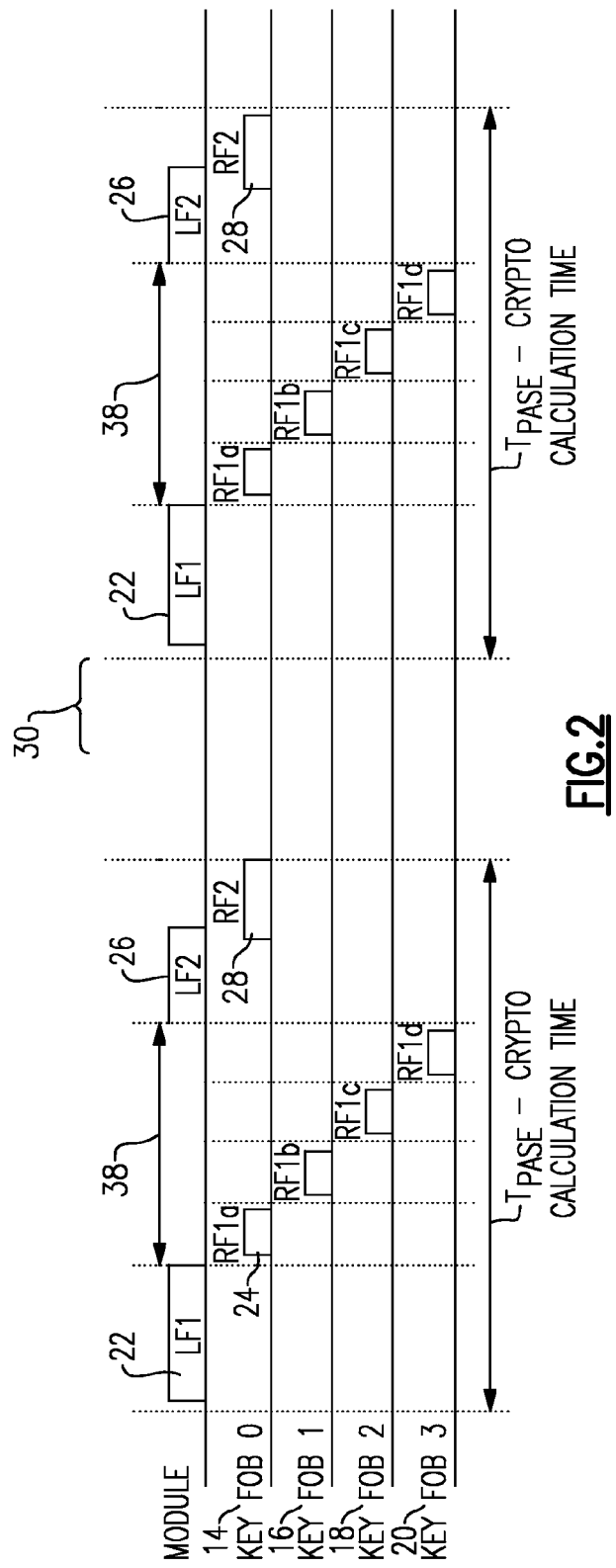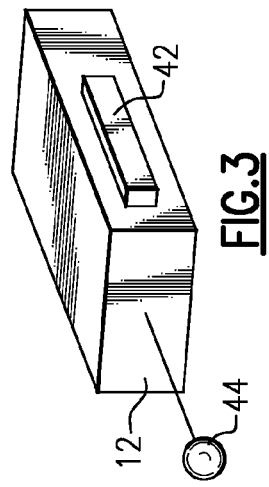

CRYPTOLOGY CALCULATION FOR REMOTE ENTRY DEVICES

CROSS REFERENCE TO RELATED APPLICATION

The application claims priority to U.S. Provisional Application No. 60/856,691 which was filed on Nov. 3, 2006.

BACKGROUND OF THE INVENTION

This invention generally relates to the authentication of passive entry and start devices. More particularly, this invention relates to the calculation of encrypted information utilized for authentication of remote identification devices.

Passive and active entry and start devices communicate with a module within a motor vehicle to authorize and perform desired functions remotely. Such functions include, for example, unlocking of the motor vehicle and enabling the starting system without a mechanical key. In order to prevent unauthorized access, the module and remote devices utilize an encryption that is utilized to confirm the authenticity of the remote device. Many such encryption methods and calculations are known and utilized. All such methods require time for the calculations to be performed. Further, in most systems, more than one authentication device such as a key fob are authorized for operation of a single vehicle. Accordingly, a separate unique authentication is required for each of the different authentication devices. Again, increasing potential wait times until operation is authorized.

In one example, a passive authentication device begins communication upon some physical prompt, such as actuation of a vehicle door handle. Upon this action, the vehicle module sends out a low frequency radio signal and then waits for a reply from proximate authentication devices. In one example system, each authentication device transmits at a predefined time. The absence of a signal at a predefined time after the LF signal indicates that that particular authentication device is not in the area. Once, the time for reply for all of the authentication devices have past, cryptology calculations for the authentication device present are performed. The cryptology calculations generate a unique encrypted message that prevents unauthorized access to vehicle functions. Such calculations can contribute to a perceptible wait period where a perception of an immediate response and actuation are desired.

Accordingly, it is desirable to design and develop an encryption calculation system and method that substantially reduces or eliminates any perceived hesitation in system response.

SUMMARY OF THE INVENTION

An example passive entry and start system includes a controller that calculates the cryptology required for each remote identification device during idle transmission time to reduce overall system actuation time.

Typically, a controller emits challenge transmissions to determine which of a plurality of remote control or authentication devices are in the proximate area. Response transmissions from those remote control devices in the area prompt the controller to calculate an encryption unique to the remote control device that sent a response transmission. The encryption takes time to calculate and therefore adds additional time to the overall system response.

The example disclosed system and method utilizes the system idle transmission time to calculate an encryption for each of the remote control devices associated with the controller. The encryption for each remote control device is saved in a non-volatile memory for use upon receipt of a response transmission. Therefore, once a response transmission from one of the plurality of remote control devices is received, the desired encryption is ready and no calculation time is required that contributes to overall system response time.

These and other features of the present invention can be best understood from the following specification and drawings, the following of which is a brief description.

BRIEF DESCRIPTION OF THE DRAWINGS

FIG. 2 is a schematic illustration of an example transmission sequence and encryption calculation timeline.

FIG. 3 is a schematic representation of an example controller.

DETAILED DESCRIPTION OF AN EXAMPLE EMBODIMENT

Figure 1:
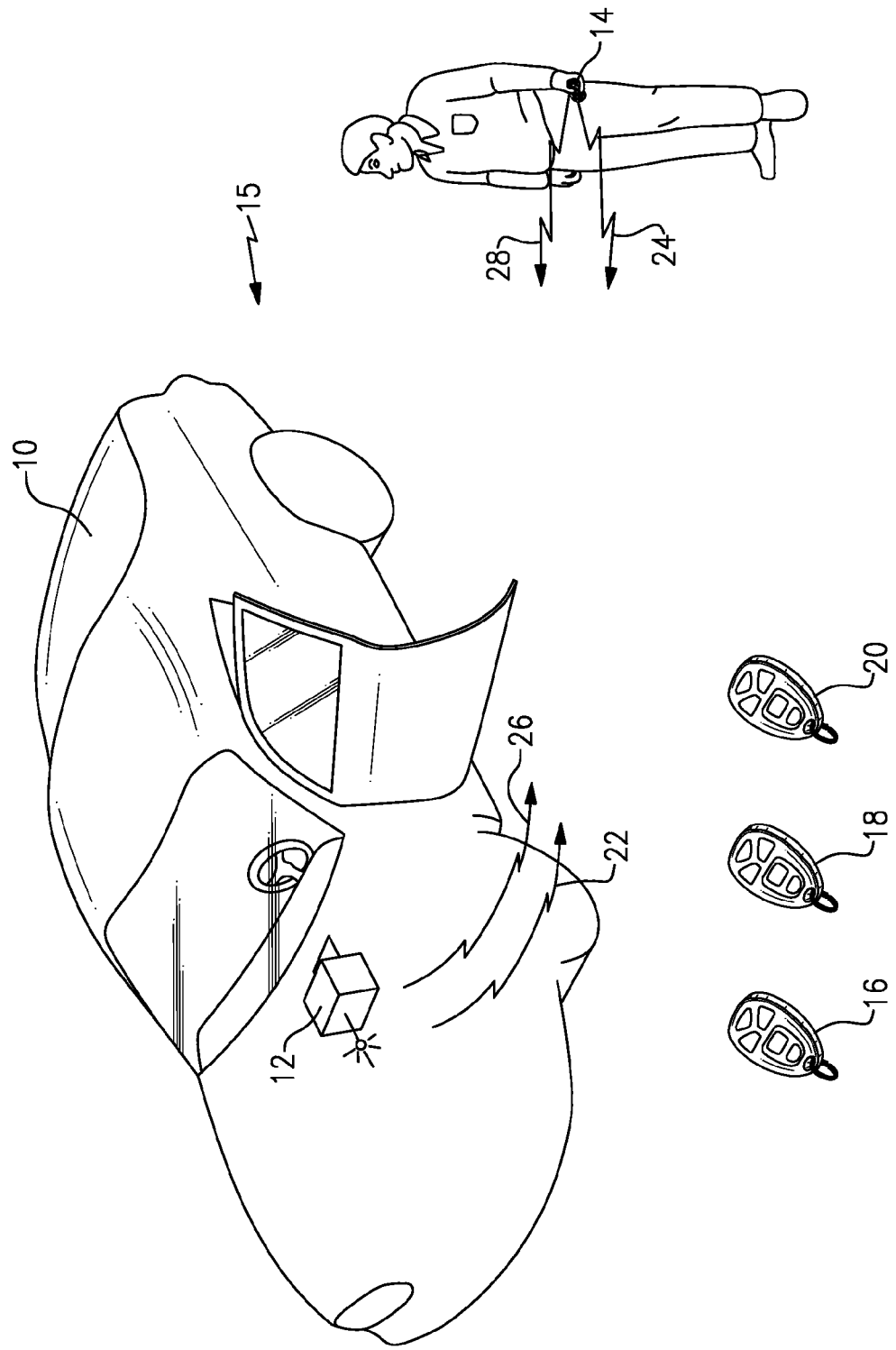
FIG. 1 is a schematic illustration of an example remote entry and start system.

Referring to FIG. 1, a vehicle 10 includes a controller 12 for transmitting and receiving signals from many remote control devices 14, 16, 18 and 20. The controller 12 and the remote control devices 14, 16, 18 and 20 are part of a passive entry and start system 15. The passive entry and start system 15 provides for access and operation of the vehicle upon receipt and verification of signals from one of the remote control devices 14, 16, 18 and 20.

Operation of the system 15 commences with the transmission of a first low frequency signal 22 from the controller 12. The first signal 22 can be in response to a physical prompt, such as for example, initial actuation of a door handle of the vehicle 12. Further, the first signal 22 can simply be a signal sent at desired periodic intervals to determine if any of the remote control devices 14, 16, 18 and 20 are within the proximate area.

The first signal 22 is a challenge signal that requests a response from any of the plurality of remote control devices 14, 16, 18 and 20 in the proximate area. Each of the plurality of remote control devices 14, 16, 18 and 20 in the area send a response transmission 24 that includes an identification code or signal. The controller 12 utilizes that identification code that is unique to the specific one of the remote control devices 14, 16, 18 and 20 to generate an encrypted portion of a second LF signal 26. The second message 26 includes encrypted information that is uniquely crafted for receipt and response from the selected one of the plurality of remote control devices 14, 16, 18 and 20. In the illustrated example, the remote control device 14 responds with a second RF signal 28 to the second LF signal 26 from the controller 12. The second RF signal 28 includes a return encrypted portion to verify authenticity along with signals that communicate desired commands such as for unlocking the vehicle doors or allowing operation of the vehicle.

Referring to FIG. 2, a time 38 from the initial LF signal 22 to the actual receipt of the second RF signal 28 is reduced by changing when the calculations are made that are required for the cryptology for each of the plurality of remote control devices 14, 16, 18 and 20. The required cryptology is not permanently saved but is calculated after each second RF signal 28 during a transmission idle time 30.

Referring to FIGS. 2 and 3, the controller 12 is schematically shown and includes an antenna 44 for emitting and receiving signals along with a non-volatile memory location 42.

In operation, the controller 12 emits a first LF signal 22. The first LF signal 22 is a challenge prompt that elicits a response from each of the proximate remote controllers 14, 16, 18 and 20. The controller 12 has a receipt time period 38 in which the first RF signal 24 from any of the proximate remote controllers sends a first RF signal 24 back to the controller 12. The receipt time period 38 is subdivided into times within which the controller expects to receive signals from a specific one of the various remote controllers 14, 16, 18 and 20. In most instances, only one of the remote controllers 14, 16, 18 and 20 will be in a proximate location to receive the challenge signal 22 and emit a return RF signal 24.

Once the return RF signal 24 is received, the controller 12 utilizes the specific saved cryptology to generate a second encrypted response specifically formulated to the remote controller, in the example, the remote controller 14 that provided the response to the challenge signal 22. In response to the encrypted signal 26 from the controller 12, the remote control device 14 sends a second RF response 28. The second response 28 includes instructions and commands to actuate desired vehicle functions.

The time between receipt of the first RF response 24 and the second LF signal 26 is reduced by the time otherwise required to formulate the required cryptology. The saved time provides for a shorter overall response from the passive start and entry systems. Once the command is received by the controller 12, a transmission idle time 30 in which no transmissions are sent or received is utilized to generate the required cryptology for all of the associated controllers 14, 16, 18 and 20 in preparation for the next RF signal that is received in response to the challenge signal 22.

Accordingly, the example system reduces wait times associated with calculating individual cryptology for a return signal by generating the required cryptology for all of the associated remote controllers 14, 16, 18 and 20 prior to the time in which such cryptology is required. Therefore, the overall system response time from the initial actuation to actual physical and perceptible action is reduced.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A passive start and entry system for a motor vehicle comprising:
   a controller including a transmitter to transmit a challenge transmission and a receiver to receive a response to the challenge transmission;
   a plurality of remote control devices to each send a response signal in response to the challenge transmission, wherein the controller is configured to calculate an encrypted signal for each of the plurality of remote control devices after completion of communication with one of the plurality of remote control devices; and
   wherein the controller is configured to authorize a vehicle function upon a response by the one of the plurality of remote control devices.

2. The system as recited in claim 1, wherein each of the plurality of remote control devices includes a unique identifier sent to the controller upon receipt of the challenge transmission.

3. The system as recited in claim 1, wherein a cryptology calculation is performed by the controller after receipt from a selected one of the plurality of remote control devices of a transmission initiating actuation of a vehicle function.

4. The system as recited in claim 3, wherein an encryption determined by the cryptology calculation is stored in a memory location within the controller for use upon a subsequent determination of a specific one of the plurality of remote control devices chosen by the controller.

5. The system as recited in claim 1, wherein each of the plurality of remote control devices responds to the challenge transmission after a predefined period unique to a specific one of the plurality of remote control devices.

6. The system as recited in claim 5, wherein the controller sends an encrypted transmission to a specific one of the plurality of remote control devices, and the response signal is received immediately after the last of the predefined periods unique to each of the plurality of remote control devices.

7. The system as recited in claim 6, wherein the encrypted transmissions is a low frequency signal.

8. The system as recited in claim 1, wherein the challenge transmission is a low frequency signal.

9. The system as recited in claim 1, wherein the controller sends the encrypted transmission to a specific one of the plurality of remote control devices, and the specific one of the plurality of remote control devices sends a second response signal in response to the encrypted transmission.

10. The system as recited in claim 9, wherein the challenge transmission is a first low frequency signal, the response signal is a first RF signal, the encrypted transmission is a second low frequency signal, and the second response signal is a second RF signal.

11. The system as recited in claim 9, wherein the controller generates the encrypted signals during a transmission idle time in which no transmissions are sent or received by the controller.

12. A method of operating a passive entry and start system comprising the steps of:
   sending a challenge transmission from a controller within a vehicle to a plurality of identification devices;
   receiving the challenge transmission and sending a response signal back to the controller from each of the plurality of identification devices;
   calculating an encrypted message for each of the plurality of identification devices upon receipt of an encrypted response from a chosen one of the plurality of identification devices;
   choosing one of the plurality of calculated encrypted messages with the controller, wherein the chosen one of the plurality of calculated encrypted messages corresponds with a chosen one of the plurality of identification devices; and
   sending the chosen one of the plurality of calculated encrypted messages to the corresponding identification device; and
   actuating a vehicle function upon a response by the chosen one of the plurality of identification devices.

13. The method as recited in claim 12, wherein each of the plurality of identification devices receiving the challenge transmission sends a response after a predefined wait period unique to each of the plurality of identification devices.

14. The method as recited in claim 12, wherein the controller sends the chosen one of the plurality of calculated encrypted messages immediately after a last predefined wait period.

15. The method as recited in claim 12, wherein the encrypted messages are calculated during a time interval after a transmission is received from an identification device and before the challenge signal is transmitted.

16. The method as recited in claim 12, wherein the challenge transmission is a low frequency signal.

17. The method as recited in claim 12, wherein the chosen one of the plurality of calculated encrypted messages is a low frequency signal.

18. The method as recited in claim 12, including the step of sending a second response signal from the chosen one of the plurality of identification devices in response to the chosen one of the plurality of calculated encrypted messages.

19. The method as recited in claim 18, wherein the challenge transmission is a first low frequency signal, the response signal is a first RF signal, the chosen one of the plurality of calculated encrypted messages is a second low frequency signal, and the second response signal is a second RF signal.

20. The method as recited in claim 12, wherein the step of calculating the encrypted messages occurs during a transmission idle time in which no transmissions are sent or received.

\* \* \* \* \*